US011190083B2

(12) United States Patent
Sanderson et al.

(10) Patent No.: US 11,190,083 B2
(45) Date of Patent: Nov. 30, 2021

(54) METHODS AND SYSTEMS FOR AN ELECTRIC MOTOR COOLING JACKET

(71) Applicant: Ford Global Technologies, LLC, Dearborn, MI (US)

(72) Inventors: Jason Sanderson, West Bloomfield, MI (US); Robert Green, Ferndale, MI (US); James Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 16/254,412

(22) Filed: Jan. 22, 2019

(65) Prior Publication Data
US 2020/0235640 A1 Jul. 23, 2020

(51) Int. Cl.
| | | |
|---|---|---|
| *H02K 9/00* | (2006.01) | |
| *H02K 5/20* | (2006.01) | |
| *H02K 5/18* | (2006.01) | |
| *H02K 1/12* | (2006.01) | |

(52) U.S. Cl.
CPC ............... *H02K 9/00* (2013.01); *H02K 1/12* (2013.01); *H02K 5/18* (2013.01); *H02K 5/20* (2013.01)

(58) Field of Classification Search
CPC .............. H02K 5/20; H02K 9/19; H02K 1/20
USPC ................................ 310/52, 54, 58, 75 R, 98
See application file for complete search history.

(56) References Cited

U.S. PATENT DOCUMENTS

| | | | | |
|---|---|---|---|---|
| 3,426,691 | A | * | 2/1969 | Anderson ............. F04D 29/588 417/370 |
| 5,923,108 | A | * | 7/1999 | Matake .................. H02K 5/128 310/89 |
| 6,515,383 | B1 | | 2/2003 | Ognibene et al. |
| 7,545,060 | B2 | | 6/2009 | Ward |
| 9,894,114 | B2 | | 2/2018 | Perry et al. |
| 2005/0268464 | A1 | * | 12/2005 | Burjes ....................... F28F 3/12 29/890.035 |
| 2008/0185924 | A1 | * | 8/2008 | Masoudipour ........... H02K 5/20 310/54 |
| 2009/0127946 | A1 | * | 5/2009 | Fee .......................... H02K 5/20 310/64 |
| 2010/0247342 | A1 | * | 9/2010 | Shimizu .................... F02C 6/12 417/410.1 |
| 2015/0057858 | A1 | * | 2/2015 | Nitta .................... F16H 57/0439 701/22 |
| 2015/0381010 | A1 | * | 12/2015 | Kobes .................... H02K 15/02 310/54 |

FOREIGN PATENT DOCUMENTS

| | | | | | |
|---|---|---|---|---|---|
| CN | 1976176 | A | | 6/2007 | |
| KR | 2009073789 | A | * | 7/2009 | |
| WO | WO-2017073051 | A | * | 5/2017 | ............. B63H 21/17 |

* cited by examiner

*Primary Examiner* — Jose A Gonzalez Quinones
(74) *Attorney, Agent, or Firm* — David Kelley; McCoy Russell LLP (57) ABSTRACT

Methods and systems are provided for a cooling jacket for a stator. In one example, the cooling jacket is cast as a single piece with windings of the stator pressed into a surface of the cooling jacket.

18 Claims, 6 Drawing Sheets

METHODS AND SYSTEMS FOR AN ELECTRIC MOTOR COOLING JACKET

FIELD

The present description relates generally to an integrated electric motor cooling jacket.

BACKGROUND/SUMMARY

Vehicles may be equipped with one or more electric motors to boost engine power and decrease emissions. Similar to other moving components of the vehicle, the electric motor may demand cooling during some vehicle operating conditions. Some cooling architectures of the electric motor may be inefficient, or lead to less cooling at other components sharing a cooling circuit with the electric motor.

One example of a cooling architecture for an electric motor may comprise a spray bar that is arranged to spray oil at windings of the stator. However, the windings may be at least partially surrounded by plastic, which may limit an area in which the oil may access the windings. The spray bar may inject excess oil to ensure that oil gains access to the windings.

However, the inventors herein have recognized potential issues with such systems. As one example, the extra oil may drip onto a converter, wherein the oil may increase drag losses as the converter spins, thereby decreasing fuel economy. The extra oil may also pool at a bottom of a case of the converter, which may eventually accumulate and interrupt a path of the converter, resulting in even further drag losses. Another issue with the spray bar is that the extra oil may result in another device on a shared oil circuit with the spray bar receiving too little oil. As such, some conditions where cooling of the electric motor and the other device is desired may result in inefficient cooling of one or both components.

Other attempts to address electric motor cooling include an electric motor cooling jacket. One example approach is shown by Yan in CN 1976176. Therein, a cooling jacket is cast and arranged over an outer diameter of the stator. The cooling jacket further comprises fins to enhance cooling.

However, the inventors herein have recognized potential issues with such systems. As one example, the fins of the cooling jacket are not arranged on an inner diameter of the cooling jacket, which may reduce a cooling effect provided to the windings and increases packaging constraints. Additionally, the cooling jacket shown by Yan slips over the stator, which utilizes radial space. Previous examples which press the windings into the cooling jacket avoid the benefit of an integrally cast cooling jacket, in that the previous examples utilize O-rings or similar sealing elements which may develop a leak. Furthermore, the cooling jacket is cast in two separate parts including a stator and transmission case. After those two parts are cast, the mating features are machined, which may be expensive and cumbersome.

In one example, the issues described above may be addressed by a system for a stator comprising a plurality of windings and a single piece cooling jacket integrated with the stator, wherein the plurality of windings is pressed into an inner diameter surface of the cooling jacket. In this way, the cooling jacket may be free of O-rings and other sealing elements which may introduce leak points to the cooling jacket.

As one example, the cooling jacket comprises at least one fin physically coupled to the inner diameter surface and extending into an interior volume of the cooling jacket. The at least one fin may divide the interior volume into zones and/or increase a distance of a coolant flow path around the inner diameter surface to increase a cooling effect. By doing this, the cooling jacket may decrease packaging constraints, decrease a likelihood of a leak occurring, and increase cooling of the windings of the stator.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-6 are shown approximately to scale, although other relative dimensions may be used, if desired.

DETAILED DESCRIPTION

Figure 1:
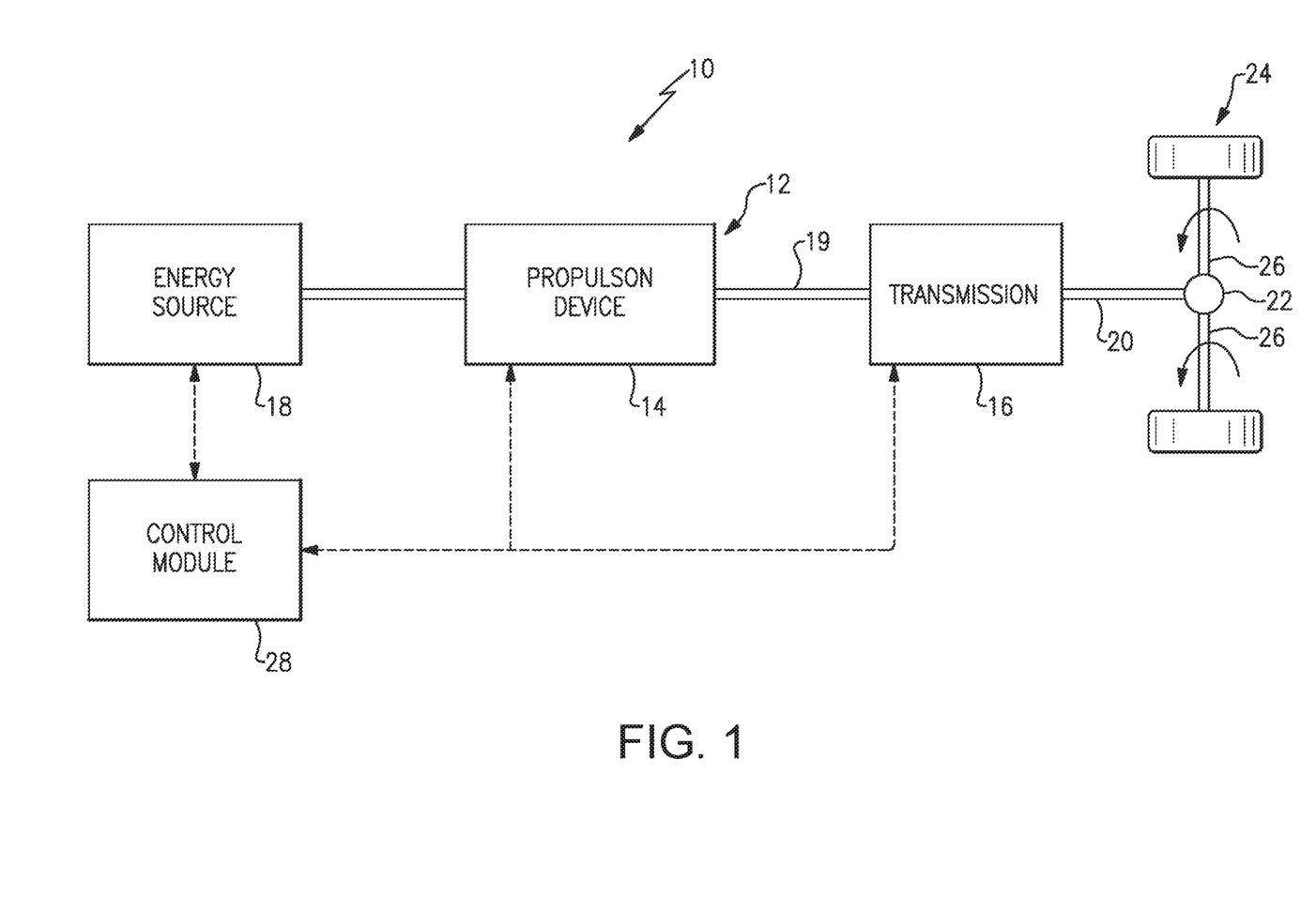
FIG. 1 illustrates a schematic of a powertrain of a vehicle.
Figure 2:
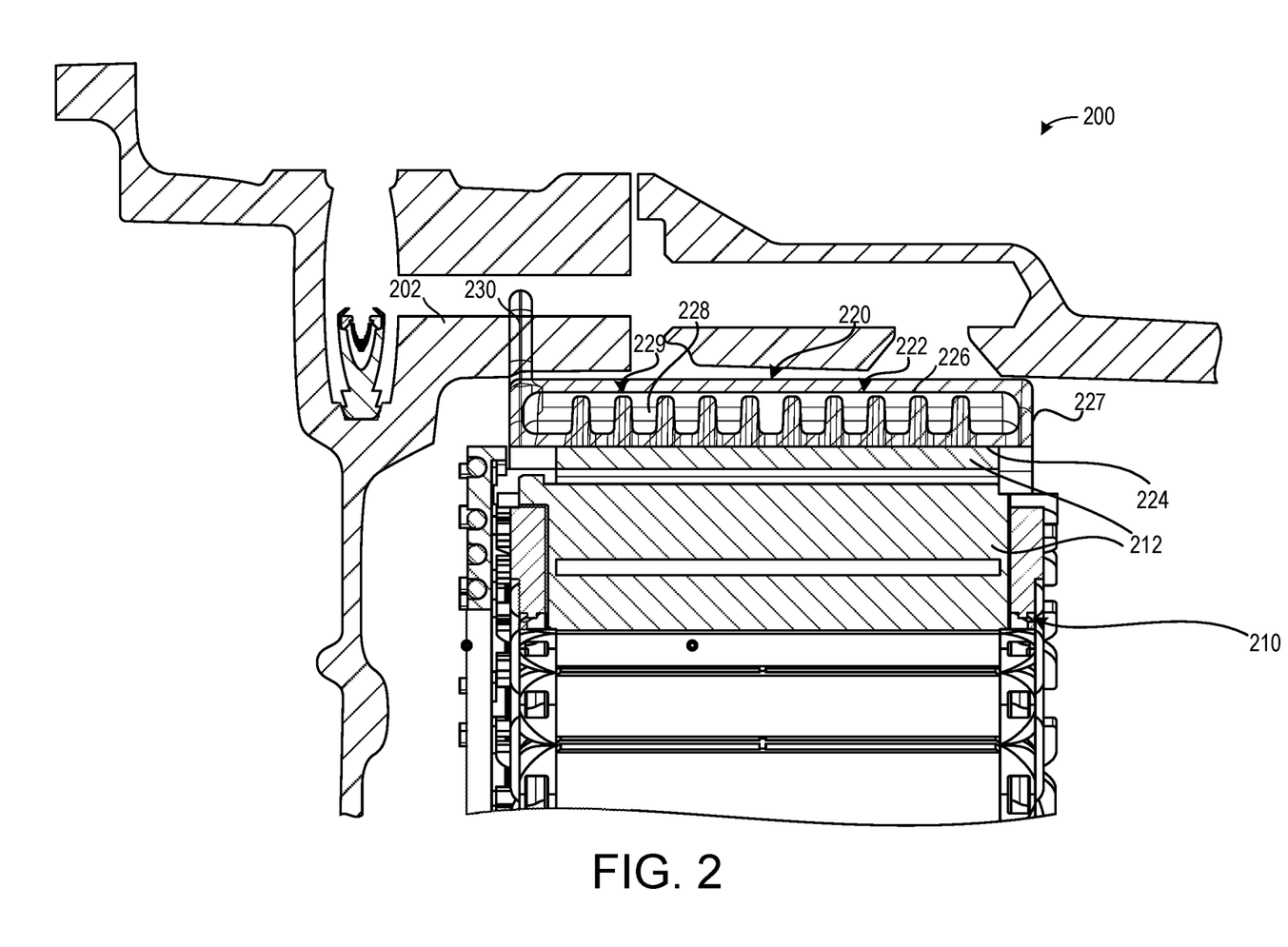
FIG. 2 illustrates a cooling jacket comprising a plurality of fins with windings of a stator pressed into its surface.

The following description relates to systems and methods for a cooling jacket for an electric motor. The cooling jacket may be cast as a single piece and integrally formed with a stator by pressing windings of the stator into an inner diameter surface of the cooling jacket. FIG. 1 schematically illustrates a powertrain of a vehicle comprising an energy source, where the energy source may include an electric motor. The electric motor may interact with and engage the stator, which may eventually request cooling. The cooling jacket, illustrated in FIGS. 3, 5, and 6, may annularly surround windings of the stator, wherein coolant in the cooling jacket may enter an interior volume and cool the windings. The cooling jacket may comprise a plurality of tabs for coupling to the front module, as shown in FIGS. 2 and 4. In this way, the stator and/or electric motor may no longer directly couple to the front module. This may allow the cooling jacket to be easily installed onto a variety of newly manufactured vehicles or retrofitted onto previously manufactured vehicles comprising different architectures.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 schematically illustrates a vehicle 10. This disclosure is applicable to many types of vehicle. For example, the vehicle 10 could be a conventional vehicle that is powered by an internal combustion engine, or could be an electrified vehicle that utilizes one or more electric machines in addition to, or as an alternative to, an engine.

The exemplary vehicle 10 includes a powertrain 12. The powertrain 12 may include a propulsion device 14 and a transmission 16 that is selectively driven by the propulsion device 14. The propulsion device 14 may be employed as an available drive source for the vehicle 10. For example, the propulsion device 14 could include an engine for a conventional vehicle, or an electric machine (i.e., an electric motor, a generator or a combined motor/generator) for an electrified vehicle.

The transmission 16 may include a gearbox having multiple gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission input shaft 19 and a transmission output shaft 20. The transmission 16 may alternatively be controlled to achieve an infinite number of ratios. These ratios can be achieved through mechanical reconfiguration as in a continuously variable transmission (CVT) or by electrical coordinate of the speeds of electric machines as in an electrically continuously variable transmission (eCVT). The transmission 16 may be automatically shifted from one ratio to another based on various vehicle and ambient operating conditions by an associated controller 28. The transmission 16 then provides powertrain output torque to the transmission output shaft 20. The transmission output shaft 20 may be connected to a differential 22. The differential 22 drives a pair of wheels 24 via respective axles 26 that are connected to the differential 22 to propel the vehicle 10.

An energy source 18 may supply power to the propulsion device 14. The energy source 18 may be a fuel system if the propulsion device 14 is an engine or a high voltage battery if the propulsion device 14 is an electric machine. For example, an engine is configured to consume fuel (i.e., gasoline, diesel, etc.) to produce a motor output, whereas the high voltage battery is configured to output and receive electrical energy that is consumed by the electric machine to produce a motor output.

The powertrain 12 of the vehicle 10 may additionally include an associated controller 28. While schematically illustrated as a single module, the controller 28 may be part of a larger control system and may be controlled by various other controllers throughout the vehicle 10, such as a vehicle system controller (VSC) that includes a powertrain control unit, a transmission control unit, engine control unit, etc. It should therefore be understood that the controller 28 and one or more other controllers can collectively be referred to as a "control module" that controls, such as through a plurality of integrated algorithms, various actuators in response to signals from various sensors to control functions associated with the vehicle 10. In one embodiment, the various controllers that make up the VSC may communicate with one another using a common bus protocol (e.g., CAN).

The controller 28 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 28 to control the vehicle 10.

The controller 28 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the controller 28 may communicate signals to and/or from the propulsion device 14, the transmission 16, and the energy source 18. In other words, these devices are in electrical communication with one another. Although not explicitly illustrated, those of ordinary skill in the art will recognize various functions or components that may be controlled by the controller 28 within each of the subsystems identified above.

The control logic stored on the controller 28 may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

Turning now to FIG. 2, it shows an embodiment 200 of a stator 210 comprising a plurality of windings 212. The stator 210 may be used with an electric motor of propulsion device 14 of FIG. 1 or with other types of electric motors. A cooling jacket 220 integrated with the stator 210 may be used in a plurality of applications that utilize an electric motor. The cooling jacket may be used in fully electric vehicles and/or hybrid vehicles. It will be appreciated that the cooling jacket 220, which is arranged outside of an electric motor housing and will be described in greater detail further below, may be used in a plurality of applications utilizing electric motors outside of vehicles. In one example, the fully electric vehicle may comprise a direct drive powertrain, a multi-speed powertrain, and the like utilizing the cooling jacket 220 for its cooling demands.

The stator 210 may be stationary with the plurality of windings 212 directly coupled thereto. The stator 210 may comprise a plurality of thin metal sheets or other similar material to decrease energy losses. In one example, the thin metal sheets are laminations. The laminations may partially surround each of the plurality of windings 212.

The plurality of windings 212 may comprise wires which are arranged in coils. Each winding of the plurality of windings 212 may be wrapped around a magnetic core, such as iron, to form magnetic poles when energized with current. In some examples, each winding of the plurality of windings 212 may comprise some amount of copper. The plurality of windings 212 may be surrounded by a material, such as plastic or the laminations, which may shield and/or house the windings.

In one example, the windings 212 extend into a region between the stator 210 and a converter (not shown). It will be appreciated by those of ordinary skill in the art that the region between the stator 210 and the converter may be reduced to decrease packaging constraints. Previous examples of stators include fastener tabs arranged on the stator to directly mount the stator to a front module 202. A spray port (not shown) may be arranged and radially spaced away from the stator to spray a fluid onto the windings 212 when cooling is desired in previous examples. However, due to the proximity of the converter to the stator, the fluid may create drag energy losses as the fluid contacts moving parts of the converter.

The cooling jacket 220 may be hollow. A plurality of fins 222 may be arranged on an interior of the cooling jacket 220. The plurality of fins 222 may be arranged adjacent to an inner diameter surface 224 of the cooling jacket 220 to enhance a cooling provided to the plurality of windings 212. Each fin of the plurality of fins 222 may be similarly shaped. In one example, each fin may comprise a square shape, where ends of the fin distal to the inner diameter surface 224 are curved and or rounded. Additionally or alternatively, the fins may comprise 90 degree bends at a portion of each fin distal to the inner diameter surface 224 so that each fin is exactly square-shaped or rectangle-shaped.

The plurality of fins 222 may be continuous and comprises a length correspondingly equal to a circumference of the inner diameter surface 224. That is to say, each fin of the plurality of fins 222 may be identical and comprise an annular shape, wherein each fin is uninterrupted as it traverses the circumference of the inner diameter surface 224. The plurality of fins 222 may be shorter than the circumference of the inner diameter surface, wherein the difference between lengths of the fins and the circumference is substantially equal to inlet and outlet ports of the cooling jacket 220.

The cooling jacket 220 may comprise ports for allowing coolant to flow in and out of an interior volume 228 defined by the inner diameter surface 224, an outer diameter surface 226, and side walls 227. The side walls 227 may be physically coupled to each of the inner diameter surface 224 and the outer diameter surface 226 at opposite extreme ends. A height of the side walls 227 may be equal to a height of the cooling jacket minus thicknesses of each of the outer diameter surface 226 and the inner diameter surface 224. As shown, the side walls 227 may be oriented perpendicularly to the inner diameter surface 224 and the outer diameter surface 226.

The inner diameter surface 224 and the outer diameter surface 226 may be parallel to one another. The outer diameter surface 226 may be arranged farther from the stator 210 and plurality of windings 212 than the inner diameter surface 226. Thus, the diameter of the outer diameter surface 226 may be larger than the diameter of the inner diameter surface 224. The outer diameter surface 226 may be free of protrusions, recesses, and other surface features. However, in one example, the outer diameter surface 226 may comprise fins extending therefrom into the interior volume 228, similar to the plurality of fins 222.

Coolant may flow through the interior volume 228 between adjacent fins of the plurality of fins 222. Portions of the interior volume 228 separated by the plurality of fins may be isolated from one another. That is to say, first and second adjacent fins may define a first zone, while second and third adjacent fins may define a second zone, wherein coolant in the first zone may be substantially isolated from coolant in the second zone. In one example, the zones may be fluidly coupled at gaps 229 located between an extreme end of each fin distal to the inner diameter surface 224 and the outer diameter surface 226. Due to the gaps 229, the interior volume 228 may be a single, continuous volume, wherein coolant in the interior volume 228 may mix throughout an entirety of the coolant jacket. However, a size of the gaps 229 may be adjusted to control an amount of mixing that may occur. For example, if the size of the gaps 229 is decreased, then the amount of mixing may also decrease. In some examples, the plurality of fins 222 may extend from the inner diameter surface 224 to the outer diameter surface 226 such that gaps 229 are not present. In this way, each zone between adjacent fins may be sealed from other zones.

Thicknesses of the inner diameter surface 224 and the outer diameter surface 226 may be substantially equal. The inner diameter surface 224 may comprise a varying thickness, wherein portions of the inner diameter surface 224 may be less thick than other portions. In one example, the inner diameter surface 224 may comprise two thicknesses, a first thickness which may be equal to a maximum thickness of the inner diameter surface 224 and a thickness of the outer diameter surface 226, and a second thickness which may be equal to a difference between the maximum thickness and an amount each winding of the windings 212 is pressed into the inner diameter surface 224. By pressing the windings 212 into the inner diameter surface 224, increased cooling of the windings 212 may be achieved, packaging constraints may be reduced, and manufacture and installation of the cooling jacket 220 and the stator 210 may be simplified, as will be described below.

In previous examples, the windings may be pressed into a steel ring, which may comprise features allowing the ring to physically couple to the front module 202. Since the windings 212 are pressed into the inner diameter surface 224 of the cooling jacket 220, one or more tabs 230 may be arranged along an outer surface of the cooling jacket 220 and shaped to allow the cooling jacket to directly, physically couple to the front module 202. In this way, the cooling jacket 220 may be installed onto a variety of vehicle shapes by rearranging the machined tabs 230 to match a front module shape. The cooling jacket 220, one or more tabs 230, stator 210, and windings 212 are described in greater detail below.

In some examples, additionally or alternatively, the cooling jacket 220 may be used with a variety of configurations of windings 212. For example, the cooling jacket 220 may be used with a distributed winding motor and a concentrated winding motor. In one example, a vehicle may comprise a concentrated winding motor arranged to assist a rear wheel drive transmission and a distributed winding motor arranged to assist a front wheel drive transmission. The cooling jacket 220 for each motor may be shaped to accommodate the different winding shapes. As known to those skilled in the art, distributed winding motors may comprise axially longer windings with less coated (e.g., the plastic coating described above).

Figure 3:
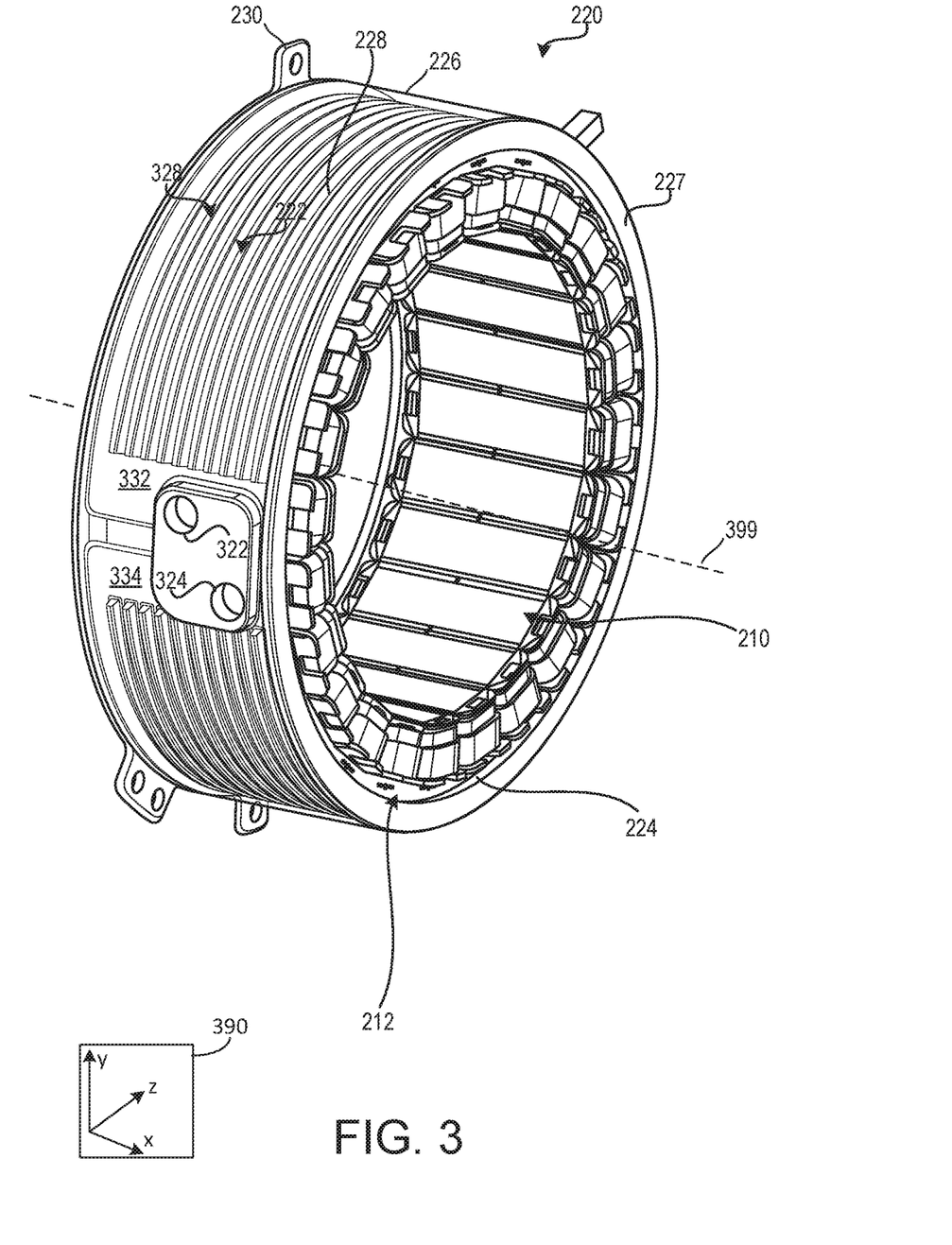
FIG. 3 illustrates a detailed view of the plurality of fins and one or more tabs for coupling the cooling jacket to a front module.
Figure 4:
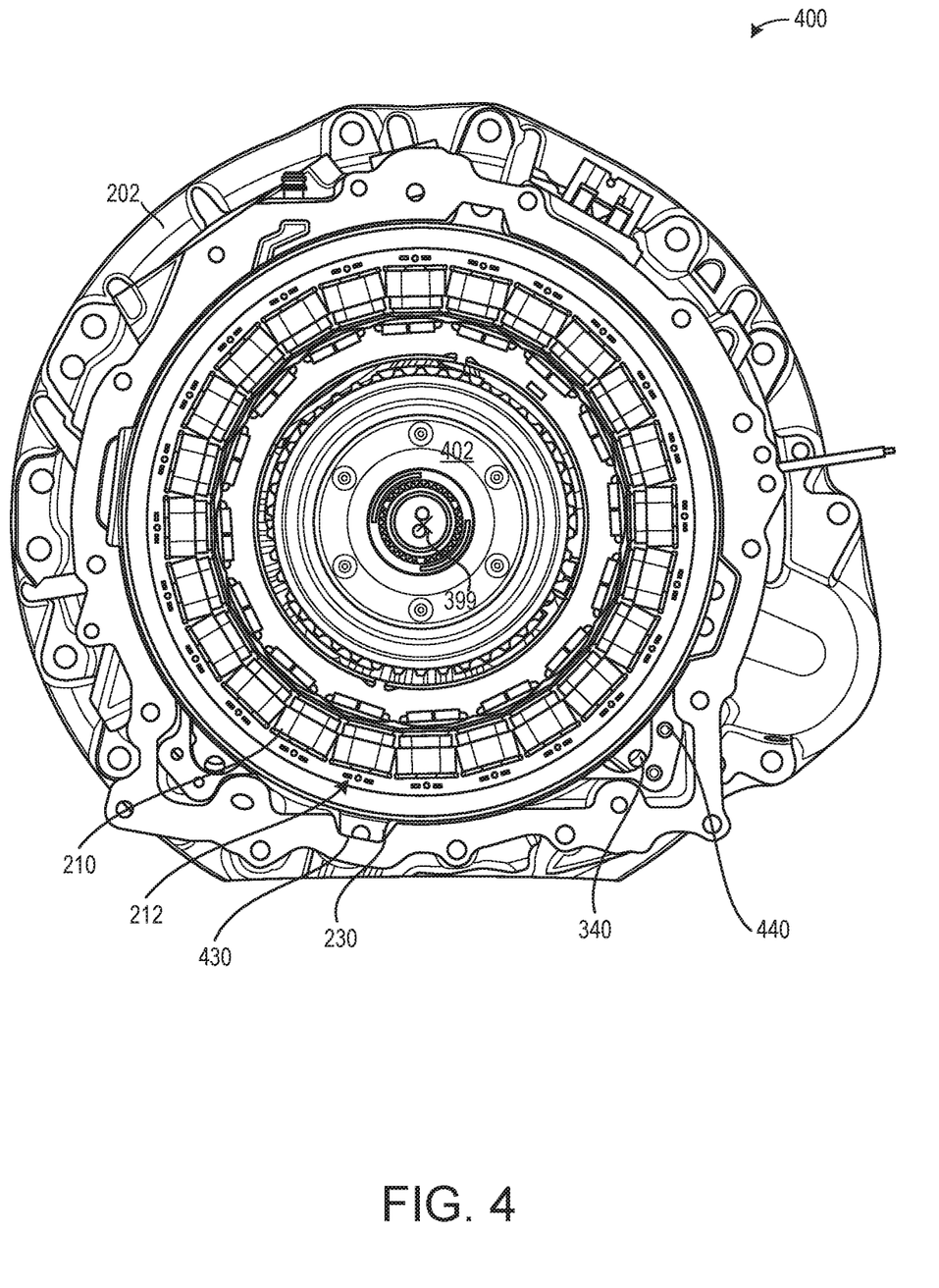
FIG. 4 illustrates an engagement between the cooling jacket and the front module.

Turning now to FIG. 3, it shows a first embodiment 300 of the cooling jacket 220 arranged to thermally communicate with the plurality of windings 212 of the stator 210. As such, components previously introduced may be similarly numbered in this figure and subsequent figures.

An axis system 390 comprises three axes, namely an x-axis parallel to a horizontal direction, a y-axis parallel to a vertical direction, and a z-axis perpendicular to each of the x- and y-axes. In one example, a width of the cooling jacket 220 may be measured along the x-axis, the x-axis being perpendicular to radii of the cooling jacket 220. Thus, the radii of the cooling jacket 220 may be arranged along a y-z plane, the y-z plane parallel to the y- and z-axes.

The cooling jacket 220 may comprise a ring shape. Additionally or alternatively, the cooling jacket 220 may comprise a toroid shape, donut shape, or other similar shape. A cross-section of the cooling jacket 220 taken along the x-direction may comprise a square and/or rectangular shape. As such, the interior volume 228 may be shaped similar to a square and/or rectangle extended annularly around an axis 399 for 360 degrees, wherein the axis 399 may be a central axis of the stator 210 or other component associated with the electric motor.

As described above, the interior volume 228 may be at least partially divided into a plurality of zones 328, wherein the zones are formed between adjacent fins of the plurality of fins 222 and the size walls 227. The cooling jacket 220 may comprise an inlet port 322 and an outlet port 324. Coolant flowing from the inlet port 322 may enter an inlet manifold 332 of the cooling jacket 320. The plurality of fins 222 may not extend into the inlet manifold 332 such that the inlet manifold 332 may not be divided. This may allow coolant to flow more easily into the cooling jacket 220. Once coolant has at least partially filled the inlet manifold 332, the coolant may begin to flow to a remainder of the interior volume 228, wherein the coolant may flow between the plurality of fins 222 in the plurality of zones 328. After flowing through an entire circumference and/or length of the interior volume, the coolant may reach an outlet manifold 334. The outlet manifold 334 may be proximal to the inlet manifold 332 and shaped substantially identically to the inlet manifold 332. However, the outlet manifold 334 is hermetically sealed from the inlet manifold 332 such that coolant is forced to flow the entire circumference of the interior volume 228 before entering the outlet manifold 334 from the inlet manifold 332. Coolant in the outlet manifold 334 may be directed to flow through the outlet port 324, where the coolant may be directed to another device.

In the example where the plurality of fins 222 extend from the inner diameter surface 224 to the outer diameter surface 226, coolant in the interior volume 228 may only mix in the inlet manifold 332 and the outlet manifold 334. Thus, coolant in a first zone of the plurality of zones 328 may not mix with coolant in a second zone of the plurality of zones 328.

In one example, the inlet port 322 and the outlet port 324 may be fluidly coupled to a single device. In one example, the single device may be a transmission, such that coolant entering the cooling jacket 220 is cooling fluid from the transmission. Additionally or alternatively, the inlet port 322 and the outlet port 324 may be fluidly coupled to a degas bottle of a radiator or may be fluidly coupled to a coolant source of another vehicle component. It will be appreciated that the inlet port 322 and outlet port 324 may be fluidly coupled to different components. For example, the inlet port 322 may receive coolant from a radiator and the outlet port 324 may direct coolant to the transmission. Conduits associated with flowing coolant to and from the inlet and outlet ports 322, 324 may be shaped based on an existing vehicle layout, wherein the sources of coolant may be selected based on proximity and cost. The coolant may be a fluid different than transmission fluid. By doing this, a transmission may not lose lubrication or clutch capacity when a temperature of the electric motor is relatively high and demands increased cooling.

In the example of FIG. 3, the cooling jacket 220 is separate from a housing of the electric motor. The cooling jacket 220 may be cast as a single piece which may decrease a manufacturing cost. Portions of the cooling jacket 220 which may be machined following its casting may include pressing the windings 212 into the inner diameter surface 224 of the cooling jacket and the one or more tabs 230 and corresponding alignment holes 340 of the tabs. The orientation of the one or more tabs 230 may be adjusted based on a shape of the front module (e.g., front module 202 of FIG. 2) such that the cooling jacket 220 may be fitted onto a variety of vehicle arrangements.

The cooling jacket 220 is completely sealed. As such, the cooling jacket 220 may be free of O-rings and other components used to seal coolant jackets. In one example, there are no additional inlets or other outlets in the cooling jacket 220 except for the inlet port 332 and the outlet port 334. This may decrease a number of leak points of the cooling jacket and of the front module as a whole, wherein possible leak points are decreased to a KO apply and lube path. During operation, oil is fed to the KO apply and lube path, wherein centripetal forces and hydraulic pressure encourage oil to flow out of the path and into a clutch piston and a lube path. Once oil passes the piston and lube path, it is flung and enters the rotor 210. The oil in the rotor 210 then drains into an oil pan to be recirculated via a pump. With the cooling jacket 220, a larger source of oil (e.g., the spray bar) is removed, resulting in less oil being pooled near spinning components of the electric motor, wherein the oil source may be the KO apply and lube path as described above. However, if oil flow from the clutch piston and/or the lube path is too low to pool up and contact the converter, then a baffle arranged between the converter and the electric motor may be removed to increase pooling so a desired amount of cooling and lubrication may be achieved.

In this way, the cooling jacket 220 may be a fully enclosed circuit fluidly coupled to a coolant circuit, wherein the cooling jacket 220 completes a closed loop circuit. As such, a greater degree of control over how much coolant is diverted to the cooling jacket 220. Additionally, since the cooling jacket 220 is a closed loop circuit, a more accurate approximation of an amount of coolant being used may be obtained, which may allow a greater balance and optimization of cooling between the transmission and the electric motor and/or stator, in the case where the cooling jacket 220 receive coolant from a transmission coolant source.

Turning now to FIG. 4, it shows a back view 400 of the front module 202 aligned and prepared to be physically coupled to the cooling jacket 220. As shown, the cooling jacket 220 is arranged between the front module 202 and the stator 210. An electric motor 402 is shown engaged with the stator 210.

The one or more tabs 230 may be arranged into corresponding pockets 430 of the front module 202 so that each tab may be flush with a surface of a corresponding pocket. In some examples, each tab may comprise padding or another dampening device which may mitigate direct contact between each tab and its corresponding pocket.

In one example, the pockets 430 may be arranged on the front module 202 such that only a single orientation of the cooling jacket 220 is allowed. Additionally or alternatively, the pockets 430 may be substantially identical to one another and arranged symmetrically about the front module 202 such that multiple orientations of the cooling jacket are allowed.

The pockets 430 may be enlarged relative to a previous example of the pockets where the pockets were shaped to receive tabs of the stator. However, the tabs 230 of the present disclosure may be arranged further diametrically outward than the tabs of the previous example due to the cooling jacket 230 being arranged radially outside of the windings 212 of the stator 210.

Through-holes 440 of the pockets 430 may align with alignment holes 340 of the tabs 230. A physical coupling device (not shown) may pass through a through-hole and corresponding alignment hole to physically couple the cooling jacket 220 to the front module. The physical coupling device may include one or more of a bolt, screw, or other similar device.

Figure 5:
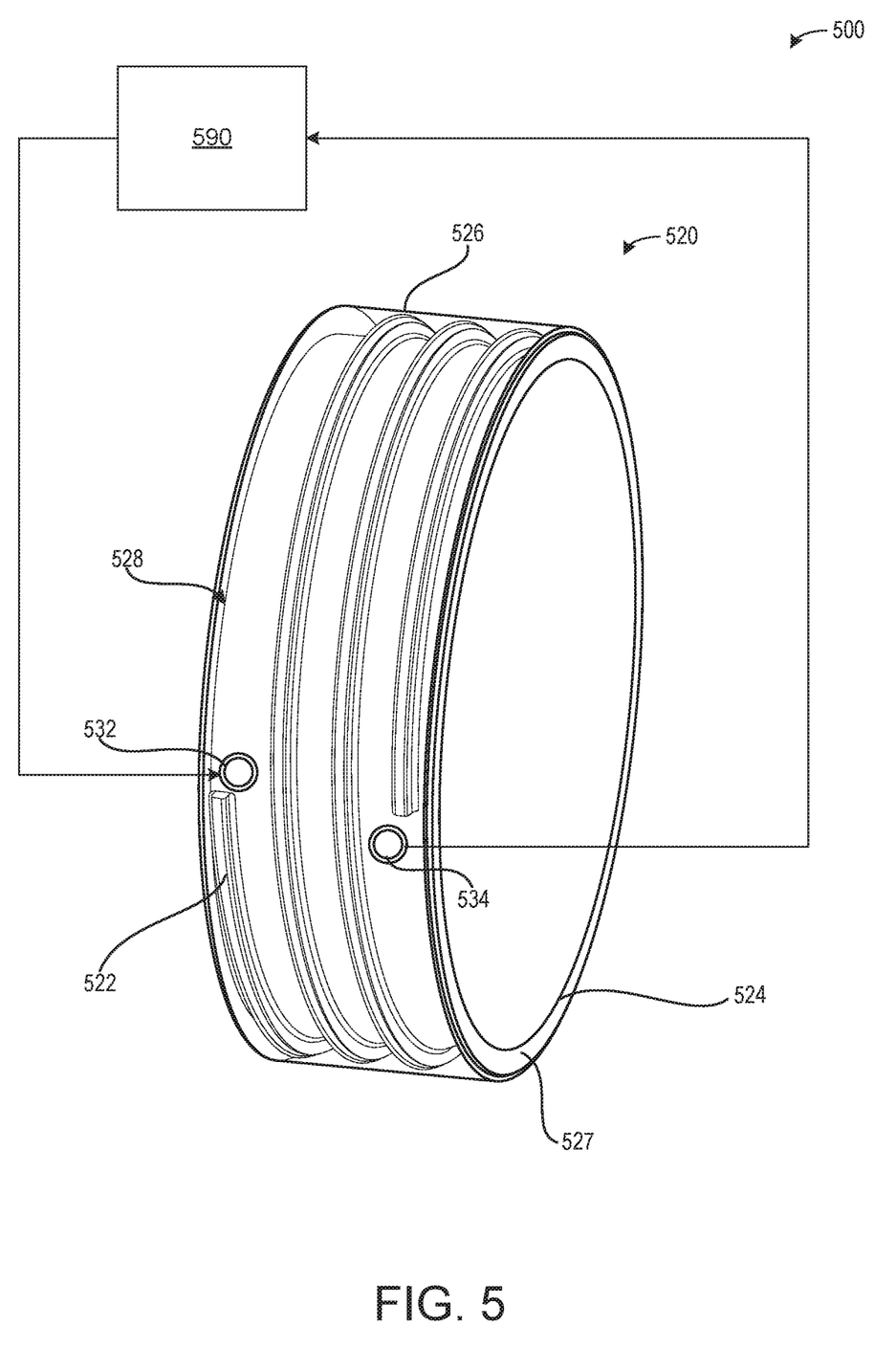
FIG. 5 illustrates an additional embodiment of the cooling jacket.

Turning now to FIG. 5, it shows an additional embodiment 500 of a cooling jacket 520. The cooling jacket 520 may be used similarly to the cooling jacket 220. More specifically, the cooling jacket 520 may comprise an inner diameter surface 524, an outer diameter surface 526, and side walls 527 which may be substantially similar to the inner diameter surface 224, the outer diameter surface 226, and side walls 227, respectively, of the cooling jacket 220 of FIG. 2.

However, the cooling jacket 520 may differ in that it comprises a single fin 522, thereby shaping an interior volume 528 differently than the interior volume 228 of FIG. 2. The single fin 522 may comprise a spiral shape. The single fin 522 may extend around a circumference of the inner diameter surface 524 multiple times. In the example of FIG. 5, the fin 522 traverses the circumference of the inner diameter surface 524 exactly three times. As such, a single zone 523 may be shaped in the interior volume 528, thereby forcing coolant entering therein to traverse the circumference of the inner diameter surface 524 multiple times before exiting the cooling jacket.

Coolant may enter the cooling jacket 520 via an inlet port 532 fluidly coupled to coolant source 590. The coolant source 590 is a transmission coolant source in one example. Additionally or alternatively, the coolant source 590 may be a radiator, engine coolant jacket, or other source. In some examples, coolant source 590 may be selected based on an arrangement of components in the vehicle, wherein a nearest coolant source may be selected. Additionally or alternatively, the coolant source 590 may be selected based on cooling demands such that cooling demands of both the coolant source 590 and the electric motor may be met.

Figure 6:
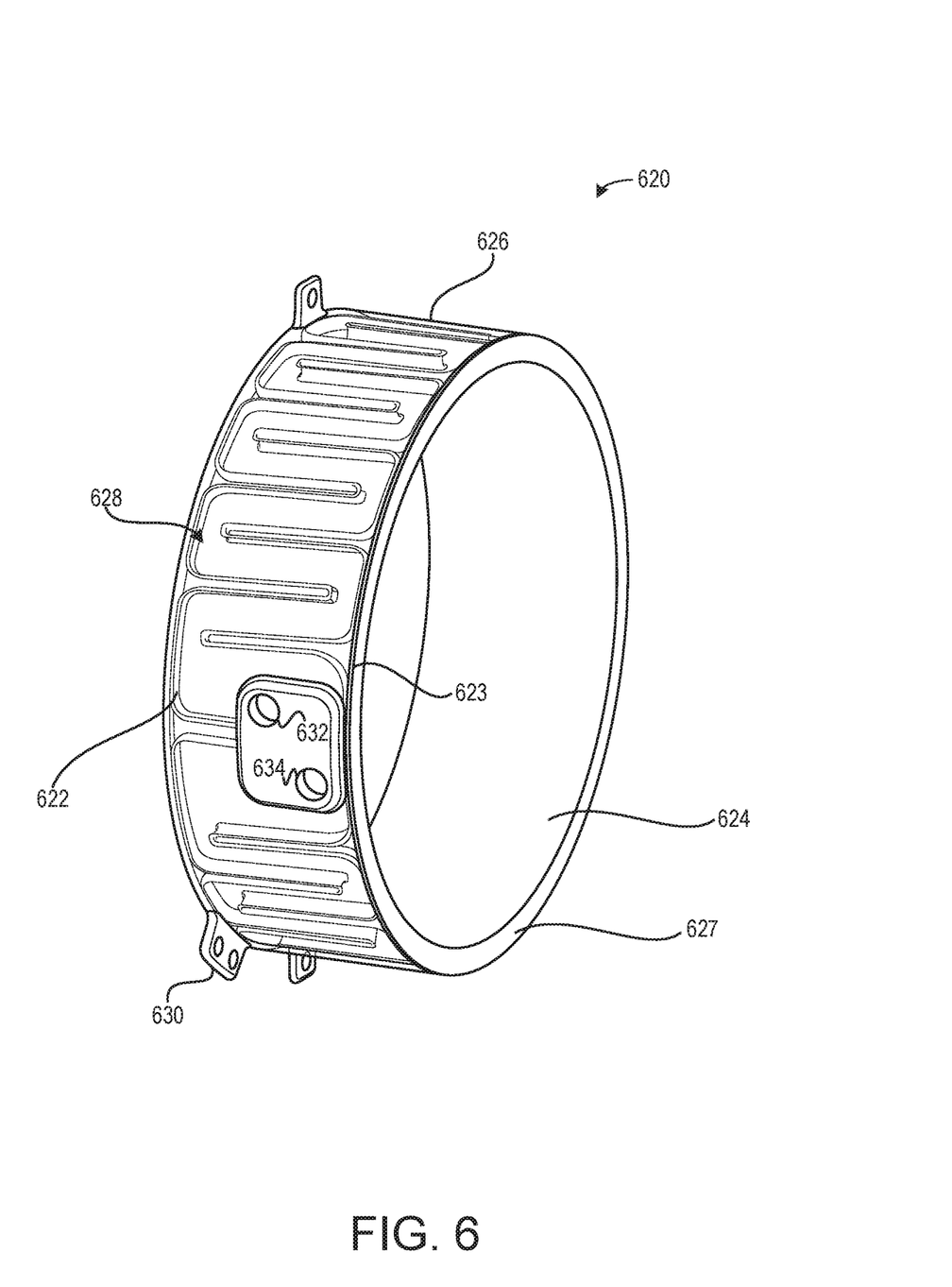
FIG. 6 illustrates a further embodiment of the cooling jacket.

Turning now to FIG. 6, it shows a further embodiment 600 of a cooling jacket 620. The cooling jacket 620 may be used similarly to the cooling jacket 220 of FIG. 2 or the cooling jacket 520 of FIG. 5. More specifically, the cooling jacket 620 may comprise an inner diameter surface 624, an outer diameter surface 626, and side walls 627 which may be substantially similar to the inner diameter surface 224, the outer diameter surface 226, and side walls 227, respectively, of the cooling jacket 220 of FIG. 2.

The cooling jacket 620 may differ from the cooling jacket 200 and the cooling jacket 520 in that it comprises two fins, a first fin 622 and a second fin 623. The first and second fin 622, 623 may divide an interior volume 628 into a "S-shaped" flow path. In one example, the interior volume 628 serpentines as it traverses a circumference of the inner diameter surface 624. As such, a distance coolant travels to flow from an inlet port 632 to an outlet port 634 may be increased relative to a straight flow path. By doing this, a cooling effect for a given amount of coolant may increase as contact between the coolant and the inner diameter surface 624, into which windings are pressed, is increased.

In this way, a cooling jacket may be cast as a single piece, which may decrease a number of leak points and provide a greater estimation of coolant entering thereto. The cooling jacket may comprise machined tabs, which may allow the cooling jacket to directly coupled to a front module. The technical effect of casting the cooling jacket as a single piece with machined tabs is to allow the cooling jacket to be arranged onto a variety of front module arrangements while mitigating leaks. Windings of a stator may be pressed into an inner diameter surface of the cooling jacket, so that packing space is reduced and cooling is increased. A fin arranged in the cooling jacket may promote further cooling as a heat transfer surface between the windings and cooling jacket is increased.

In another representation, the embodiments described above are for a hybrid vehicle.

In one embodiment, a system comprises a stator comprising a plurality of windings, and a single piece cooling jacket integrated with the stator, wherein the plurality of windings is pressed into an inner diameter surface of the cooling jacket. A first example of the system further includes where the cooling jacket comprises at least one fin physically coupled to the inner diameter surface. A second example of the system, optionally including the first example, further includes where the cooling jacket comprises one or more tabs arranged on an outer diameter surface, wherein the one or more tabs align with one or more pockets of a front module. A third example of the system, optionally including the first and/or second examples, further includes where the cooling jacket comprises an interior volume defined by the inner diameter surface, an outer diameter surface, and side walls, wherein the inner diameter surface comprises a plurality of fins dividing the interior volume into circular flow paths. A fourth example of the system, optionally including one or more of the first through third examples, further includes where the circular flow paths extend from an inlet manifold to an outlet manifold of the cooling jacket, the inlet manifold shaped to receive coolant from an inlet port and the outlet manifold shaped to direct coolant to an outlet port, the inlet port and outlet port arranged proximally to one another at opposite ends of the circular flow paths. A fifth example of the system, optionally including one or more of the first through fourth examples, further includes where the cooling jacket is arranged between the stator and a front module. A sixth example of the system, optionally including one or more of the first through fifth examples, further includes where the cooling jacket is arranged outside of an electric motor housing.

In another representation, a cooling system for an electric motor comprises a cooling jacket integrally formed with a stator, wherein the cooling jacket is cast as a single piece and a plurality of windings of the stator are pressed into an inner diameter surface of the cooling jacket, wherein the inner diameter surface comprises at least one fin protruding therefrom into an interior volume of the cooling jacket. A first example of the cooling system further includes where the at least one fin traverses a circumference of the inner diameter surface more than once. A second example of the cooling system, optionally including the first example, further includes where the at least one fin is a first fin of a plurality of fins comprising fins identical to the first fin, the plurality of fins extending parallel to one another around a circumference of the inner diameter surface from an inlet port to an outlet port. A third example of the cooling system, optionally including the first and/or second examples, further includes where each fin of the plurality of fins comprises a circular shape. A fourth example of the cooling system, optionally including one or more of the first through third examples, further includes where the at least one fin is a first fin, further comprising a second fin, and where the first fin and the second fin serpentine along a circumference of the inner diameter surface from an inlet port to an outlet port, the first fin and the second fin generating a flow path for coolant to flow through. A fifth example of the cooling system, optionally including one or more of the first through fourth examples, further includes where the interior volume is defined by the inner diameter surface, an outer diameter surface, and side walls, the side walls physically coupled to and oriented perpendicularly to each of the inner diameter surface and the outer diameter surface, and where the outer diameter surface is parallel to the inner diameter surface, the outer diameter surface arranged distally to the stator relative to the inner diameter surface. A sixth example of the cooling system, optionally including one or more of the first through fifth examples, further includes where the outer diameter surface comprises one or more tabs shaped with alignment holes for physically coupling the cooling jacket to a front module, and where the cooling jacket is between the front module and the stator when the cooling jacket is physically coupled to the front module. A seventh example of the cooling system, optionally including one or more of the first through sixth examples, further includes where the interior volume comprises a rectangular cross-section, and where the interior volume extends around an entire circumference of the inner diameter surface.

In another, further representation of a cooling system, the cooling system comprises a cooling jacket comprising a single-piece, mold cast body comprising an inner diameter surface parallel to an outer diameter surface and side walls physically coupled to each of the inner and outer diameter surfaces, each of the side walls and inner and outer diameter surfaces defining an interior volume through which coolant flows, an inlet port shaped to admit coolant into the interior volume and an outlet port shaped to direct coolant out of the interior volume, the inlet and outlet ports arranged proximally to one another, at least one fin physically coupled to the inner diameter surface, wherein the fin protrudes into the interior volume and generates two or more coolant paths for coolant to flow through along a circumference of the inner diameter surface from the inlet port to the outlet port, and a plurality of windings physically coupled to a stator, the plurality of windings pressed into the inner diameter surface of the cooling jacket. A first example of the cooling system further comprises where the plurality of windings does not contact coolant in the interior volume. A second example of the cooling system, optionally including the first example, further includes where there are no additional inlets or other outlets to the interior volume other than the inlet port and the outlet port. A third example of the cooling system, optionally including the first and/or second examples, further includes where a plurality of tabs physically coupled to the outer diameter surface, the plurality of tabs shaped to engage a plurality of pockets of a front module. A fourth example of the cooling system, optionally including one or more of the first through third examples, further includes where the inlet port and the outlet port are fluidly coupled to a transmission coolant source.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a stator comprising a plurality of windings;
a single piece cooling jacket integrated with the stator and free of sealing elements, wherein the plurality of windings is in face-sharing contact with an inner diameter surface of the cooling jacket with no intervening components arranged therebetween, wherein an inlet port and an outlet port of the cooling jacket are arranged proximally to each other and configured to flow coolant along a single circumferential direction of the cooling jacket; and
wherein the cooling jacket comprises one or more tabs arranged on an outer diameter surface, and wherein the one or more tabs align with one or more pockets of a front module.

2. The system of claim 1, wherein the cooling jacket comprises at least one fin physically coupled to the inner diameter surface.

3. The system of claim 1, wherein the cooling jacket comprises an interior volume defined by the inner diameter surface, an outer diameter surface, and side walls, wherein the inner diameter surface comprises a plurality of fins dividing the interior volume into circular flow paths.

4. The system of claim 3, wherein the circular flow paths extend from an inlet manifold to an outlet manifold of the cooling jacket, the inlet manifold shaped to receive coolant from the inlet port and the outlet manifold shaped to direct coolant to the outlet port, the inlet port and outlet port arranged proximally to one another at opposite ends of the circular flow paths, and wherein the circular flow paths direct coolant along the single circumferential direction.

5. The system of claim 1, wherein the cooling jacket is arranged between the stator and the front module.

6. The system of claim 1, wherein the cooling jacket is arranged outside of an electric motor housing.

7. A cooling system for an electric motor comprising:
a cooling jacket integrally formed with a stator and free of sealing elements, wherein the cooling jacket is cast as a single piece and a plurality of windings of the stator are in face-sharing contact with an inner diameter surface of the cooling jacket with no intervening components arranged therebetween, wherein the inner diameter surface comprises at least one fin protruding therefrom into an interior volume of the cooling jacket, and wherein an inlet port and an outlet port are arranged proximally to one another at opposite ends of at least one fin, and wherein coolant from the inlet port flows through the cooling jacket to the outlet port along a single circumferential direction, and wherein an outer diameter surface comprises one or more tabs shaped with alignment holes for physically coupling the cooling jacket to a front module.

8. The cooling system of claim 7, wherein the at least one fin traverses a circumference of the inner diameter surface more than once.

9. The cooling system of claim 7, wherein the at least one fin is a first fin of a plurality of fins comprising fins identical to the first fin, the plurality of fins extending parallel to one another around a circumference of the inner diameter surface from the inlet port to the outlet port.

10. The cooling system of claim 9, wherein each fin of the plurality of fins comprises a circular shape.

11. The cooling system of claim 7, wherein the at least one fin is a first fin, further comprising a second fin, and where the first fin and the second fin serpentine along a circumference of the inner diameter surface from the inlet port to the outlet port, the first fin and the second fin generating a flow path for coolant to flow through.

12. The cooling system of claim 7, wherein the interior volume is defined by the inner diameter surface, the outer diameter surface, and side walls, the side walls physically coupled to and oriented perpendicularly to each of the inner diameter surface and the outer diameter surface, and where the outer diameter surface is parallel to the inner diameter surface, the outer diameter surface arranged distally to the stator relative to the inner diameter surface.

13. The cooling system of claim 12, wherein the cooling jacket is between the front module and the stator when the cooling jacket is physically coupled to the front module.

14. The cooling system of claim 7, wherein the interior volume comprises a rectangular cross-section, and where the interior volume extends around an entire circumference of the inner diameter surface.

15. A cooling system comprising:
a cooling jacket comprising a single-piece, mold cast body free of sealing elements comprising an inner diameter surface parallel to an outer diameter surface and side walls physically coupled to each of the inner and outer diameter surfaces, each of the side walls and inner and outer diameter surfaces defining an interior volume through which coolant flows;
an inlet port shaped to admit coolant into the interior volume and an outlet port shaped to direct coolant out of the interior volume, the inlet and outlet ports arranged proximally to one another and configured to flow coolant in a single circumferential direction of the cooling jacket;
at least one fin physically coupled to the inner diameter surface, wherein the fin protrudes into the interior volume and generates two or more coolant paths for coolant to flow through along a circumference of the inner diameter surface from the inlet port to the outlet port;
a plurality of windings physically coupled to a stator, the plurality of windings in face-sharing contact with the inner diameter surface of the cooling jacket with no intervening components arranged therebetween; and
a plurality of tabs physically coupled to the outer diameter surface, the plurality of tabs shaped to engage a plurality of pockets of a front module.

16. The cooling system of claim 15, wherein the plurality of windings does not contact coolant in the interior volume.

17. The cooling system of claim 15, wherein there are no additional inlets or other outlets to the interior volume other than the inlet port and the outlet port.

18. The cooling system of claim 15, wherein the inlet port and the outlet port are fluidly coupled to a transmission coolant source, and wherein coolant in the cooling jacket flows less than 360 degrees about the inner diameter surface from the inlet port to the outlet port.

* * * * *